(12) United States Patent
Francois et al.

(10) Patent No.: US 8,859,064 B2
(45) Date of Patent: Oct. 14, 2014

(54) KIT FOR TIGHTLY COVERING AN ELONGATE MEMBER OF PREDETERMINED DIMENSIONS WITH A PROTECTIVE ELASTIC SLEEVE

(75) Inventors: Pierre Henri Adrien Francois, Bordeaux (FR); Piotr Gorecki, Terrasson la Villedieu (FR); Stephane Areias, Varetz (FR)

(73) Assignee: Societe Industrielle de Construction d'Appareils et de Materiel Electriques, Arnac Pompadour (FR)

( * ) Notice: Subject to any disclaimer, the term of this patent is extended or adjusted under 35 U.S.C. 154(b) by 718 days.

(21) Appl. No.: 12/781,854

(22) Filed: May 18, 2010

(65) Prior Publication Data

US 2010/0291333 A1 Nov. 18, 2010

(30) Foreign Application Priority Data

May 18, 2009 (FR) .................................. 09 02408

(51) Int. Cl.
| | | |
|---|---|---|
| *B29D 22/00* | (2006.01) | |
| *B29D 23/00* | (2006.01) | |
| *B32B 1/08* | (2006.01) | |
| *B60R 21/16* | (2006.01) | |
| *B23P 11/02* | (2006.01) | |
| *H01R 43/00* | (2006.01) | |
| *H02G 15/18* | (2006.01) | |

(52) U.S. Cl.
CPC ................................ *H02G 15/1826* (2013.01)
USPC .............. 428/36.1; 428/36.2; 29/450; 29/859

(58) Field of Classification Search
USPC ............................ 428/36.1, 36.2; 29/450, 859
See application file for complete search history.

(56) References Cited

U.S. PATENT DOCUMENTS

| | | | | |
|---|---|---|---|---|
| 3,781,183 | A | * 12/1973 | Doll | ............................... 428/136 |
| 4,512,419 | A | * 4/1985 | Rowley et al. | ................... 175/58 |
| 4,513,551 | A | * 4/1985 | Gauffin et al. | ................... 52/364 |
| 5,480,203 | A | * 1/1996 | Favalora et al. | ............ 294/86.42 |
| 5,495,650 | A | * 3/1996 | Crepel et al. | ..................... 29/235 |
| 5,735,981 | A | * 4/1998 | Winfield et al. | ................. 156/52 |
| 2007/0178269 | A1* | 8/2007 | Relats et al. | ................. 428/36.1 |
| 2008/0202958 | A1* | 8/2008 | Hanlen et al. | ................. 206/320 |

FOREIGN PATENT DOCUMENTS

| | | |
|---|---|---|
| FR | 2 791 480 | 9/2000 |
| WO | 94/23480 | 10/1994 |

OTHER PUBLICATIONS

French Search Report dated Dec. 7, 2009, from corresponding French application.

* cited by examiner

*Primary Examiner* — Jeremy R Pierce
(74) *Attorney, Agent, or Firm* — Young & Thompson

(57) ABSTRACT

A kit including a sleeve; a tubular core for stretching the sleeve, tightly covered by the sleeve and adapted to receive internally an elongate member; and a thin and flexible sliding element disposed between the sleeve and the core to enable the core to slide relative to the sleeve. The sliding element makes a half-turn over a first end of the core so as thereafter to be disposed inside the core in order to be able to be pulled from the second end of the core. The sliding element includes a net formed of flexible filaments with at least one layer of filaments connected to each other in a predetermined arrangement. The filaments are adapted to slide on the outside surface of the core and to turn back on themselves around the first end of the core.

10 Claims, 4 Drawing Sheets

KIT FOR TIGHTLY COVERING AN ELONGATE MEMBER OF PREDETERMINED DIMENSIONS WITH A PROTECTIVE ELASTIC SLEEVE

BACKGROUND OF THE INVENTION

1. Field of the Invention

The invention relates to placing a protective elastic sleeve on an elongate member such as an electrical cable end.

2. Description of the Related Art

Kits for this purpose are known already, notably from French patent application 2 791 480, including, in addition to the elastic sleeve, a tubular core for stretching the sleeve, which covers the core tightly, the core being adapted to receive internally the elongate member and then to slide relative to the elongate member and relative to the elastic sleeve so that the latter comes to cover the elongate member tightly.

To enable the elastic sleeve to slide relative to the tubular core, there is disposed between them a film with a low coefficient of friction that extends beyond one end of the sleeve as far as an end of the core opposite said end of the sleeve, the film making a half-turn over this end of the core, inside which it is connected to an elastic tie fixed to the other end of the core so as to be tensioned.

This elastic tie assists sliding of the low coefficient of friction film relative to the core.

BRIEF SUMMARY OF THE INVENTION

The invention aims to provide a kit of the same kind that is particularly simple, convenient and economical.

To this end it proposes a kit for tightly covering an elongate member with predetermined dimensions with a protective elastic sleeve, which kit includes:
  said sleeve;
  a tubular core for stretching said sleeve, tightly covered by said sleeve and adapted to receive internally said elongate member; and
  a thin and flexible sliding element disposed between said sleeve and said core to enable said core to slide relative to said sleeve, which sliding element makes a half-turn over a first end of the core so as thereafter to be disposed inside the core in order to be able to be pulled from the second end of the core opposite said first end;
characterized in that said sliding element includes a net formed of flexible filaments with at least one layer of filaments connected to each other in a predetermined arrangement, which filaments of said layer are adapted to slide on the outside surface of the core and to turn back on themselves around said first end of the core.

To place the sleeve on the elongate member, the net is pulled on the side of the second end of the core. Because of this traction, the core slides relative to the sleeve and to the elongate member in the direction from the first end of the core toward its second end.

Because it is formed of flexible filaments, the net intrinsically has a particularly high aptitude for being turned back on itself. Because the filaments are connected to each other in a predetermined arrangement, the movements of the various filaments relative to the core remain homogeneous. The core is therefore extracted by a regular movement that helps to make the sleeve placement maneuver effective.

The net is thus capable of replacing the low coefficient of friction film conventionally used until now to enable sliding between the sleeve and the core, and is even capable of replacing the elastic tie or element provided in some cases to cause the low coefficient of friction film to move.

It will be noted that the net is less costly than the film conventionally used. Moreover, provided that the hardness or elasticity of the elastic sleeve is not too high, it is possible to use the net on its own, without adding lubricant.

Preferably, for reasons of simplicity and economy, in particular of fabrication, said sliding element is formed only by said net.

According to features preferred because of the quality of the results obtained:
  said net is tubular;
  said net includes, further to the layer, called first layer, filaments adapted to slide on the outside surface of the core and to turn back on themselves around the first end of the core and a second layer of filaments superposed on said first layer;
  at rest, said net has regular meshes each of lozenge shape;
  said net is formed by plastic material filaments welded to each other at the corners of said meshes;
  said net is tubular and has regularly distributed meshes, with a number of meshes around a circumference between 18 and 42 inclusive and, at rest, a number of meshes per unit axial length between 0.69 and 1.57 per cm inclusive;
  said net is made of polypropylene;
  said net extends inside said core over the whole of its length and then outside the core beyond said second end thereof; and/or
  said first end of the core is rounded.

BRIEF DESCRIPTION OF THE DRAWINGS

The explanation of the invention continues next with a detailed description of one embodiment of the invention, given hereinafter by way of nonlimiting illustration and with reference to the appended drawings.

In the drawings.

DETAILED DESCRIPTION OF THE PREFERRED EMBODIMENTS

Figure 1:
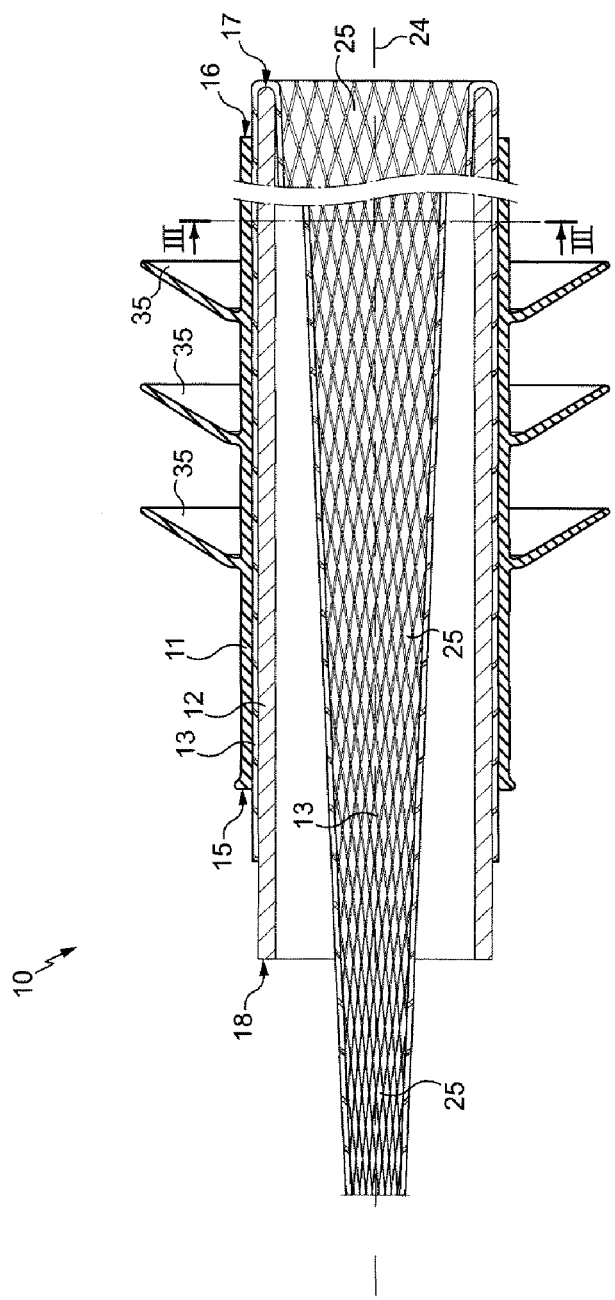
FIG. 1 is a view in section of a kit of the invention.

As seen in FIG. 1 in particular, the kit 10 shown in the drawings includes a protective elastic sleeve 11, a tubular core 12 and a tubular net 13.

The sleeve 11 is for tightly covering an elongate member, such as an electrical cable end 30 fitted with a connecting terminal (FIG. 6), in order to provide electrical insulation and an airtight and watertight seal.

The tubular core 12 stretches the sleeve 11 radially relative to the state that it adopts in the absence of external load. The core 12 is therefore tightly covered by the sleeve 11.

Figure 6:
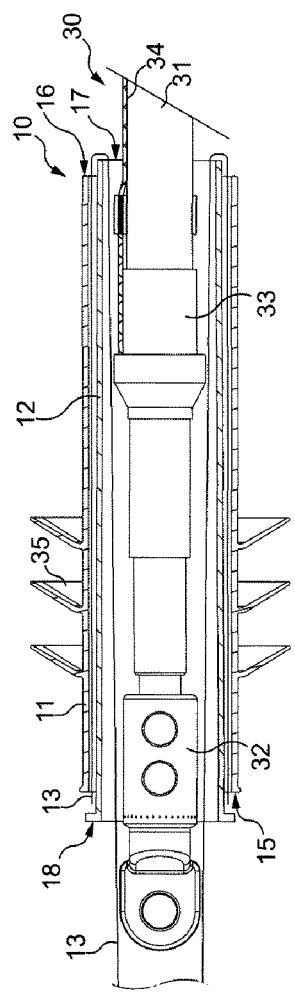
FIG. 6 is a diagrammatic view of the kit of the invention in which is internally received an elongate member to be covered tightly by the elastic sleeve of the kit, the elongate member here being the end of an electrical cable fitted with a connecting terminal.

As shown in FIG. 6, the core 12 is adapted to receive internally the elongate member that is to be covered by the protective sleeve 11.

The tubular net 13 forms a thin and flexible sliding member disposed between the sleeve 11 and the core 12 to enable them to slide relative to each other.

The core 12 can thus slide relative to the elongate member that is placed inside it and relative to the sleeve 11 so that the latter comes to cover the elongate member tightly, as explained in more detail hereinafter.

The core 12 extends beyond each of the ends 15 and 16 of the sleeve 11.

The end 17 of the core 12 is relatively close to the end 16 of the sleeve 11 situated at the same end whereas the other end 18 of the core 12 is relatively far away from the end 15 of the sleeve 11 situated at the same end.

The proximity of the ends 16 and 17 is beneficial in that it provides a simple and convenient way to begin the extraction of the core 12, which is effected by movement of the core 12 relative to the sleeve 11 in the direction from the end 17 toward the end 18, as explained hereinafter.

The net 13 is disposed between the elastic sleeve 11 and the core 12 over the whole of the length of the sleeve 11, i.e. between its ends 15 and 16.

The net 13 extends slightly beyond the end 15.

At the other end of the sleeve 11, the net 13 extends beyond the end 16 until it makes a half-turn over the end 17 of the sleeve 11 situated at the same end as the end 16 and then extends firstly inside the core 12 over the whole of its length and then outside the core 12 beyond its end 18.

The portion of the net 13 that extends beyond the end 18 is used to grasp the net 13 in the hand in order to pull on it in order to place the sleeve 11, as explained hereinafter.

The net 13 is described in detail next.

Here it is a tubular net of the type used for the protection and packaging of objects such as bottles, tools or machined parts. Such nets are available from the company Plastifrance, Gémenos (13881), France, for example.

Figure 4:
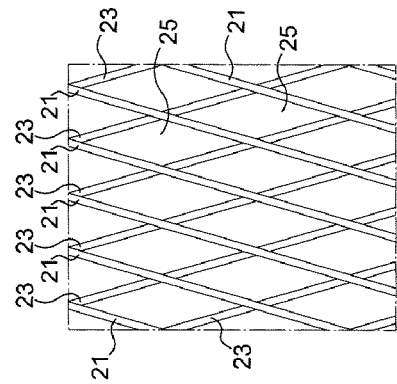
FIG. 4 is a partial plan view of the portion marked IV-IV in FIG. 3.
Figure 5:
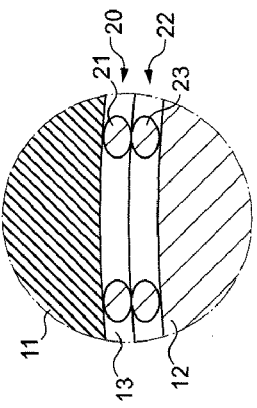
FIG. 5 is an enlarged view of the detail marked V in FIG. 3.
Figure 3:
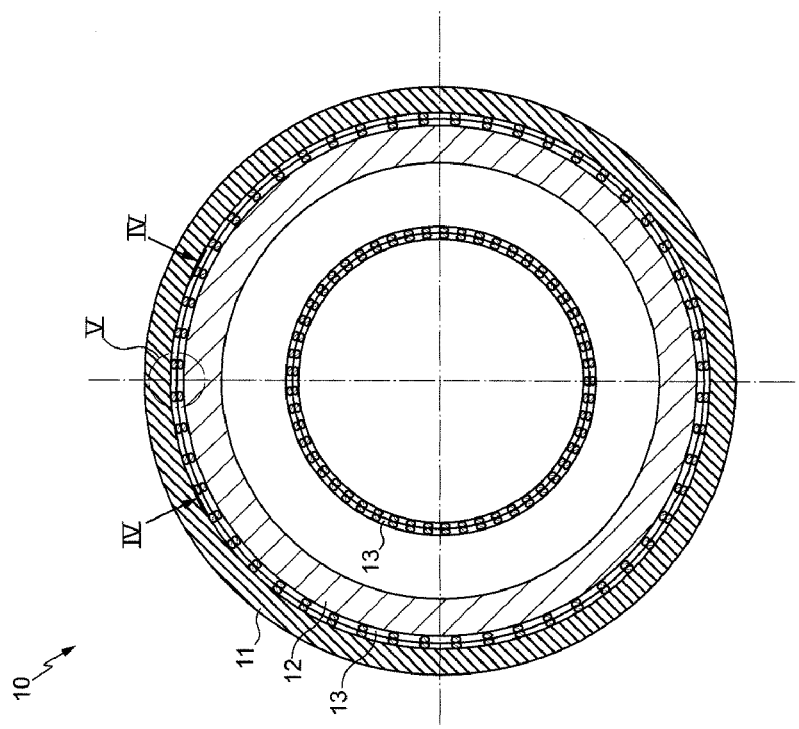
FIG. 3 is a view in section taken along the line III-III in FIG. 1.

As seen in FIGS. 4 and 5 in particular, the net 13 is formed by a first layer 20 of filaments 21 and a second layer 22 of filaments 23.

Figure 2:
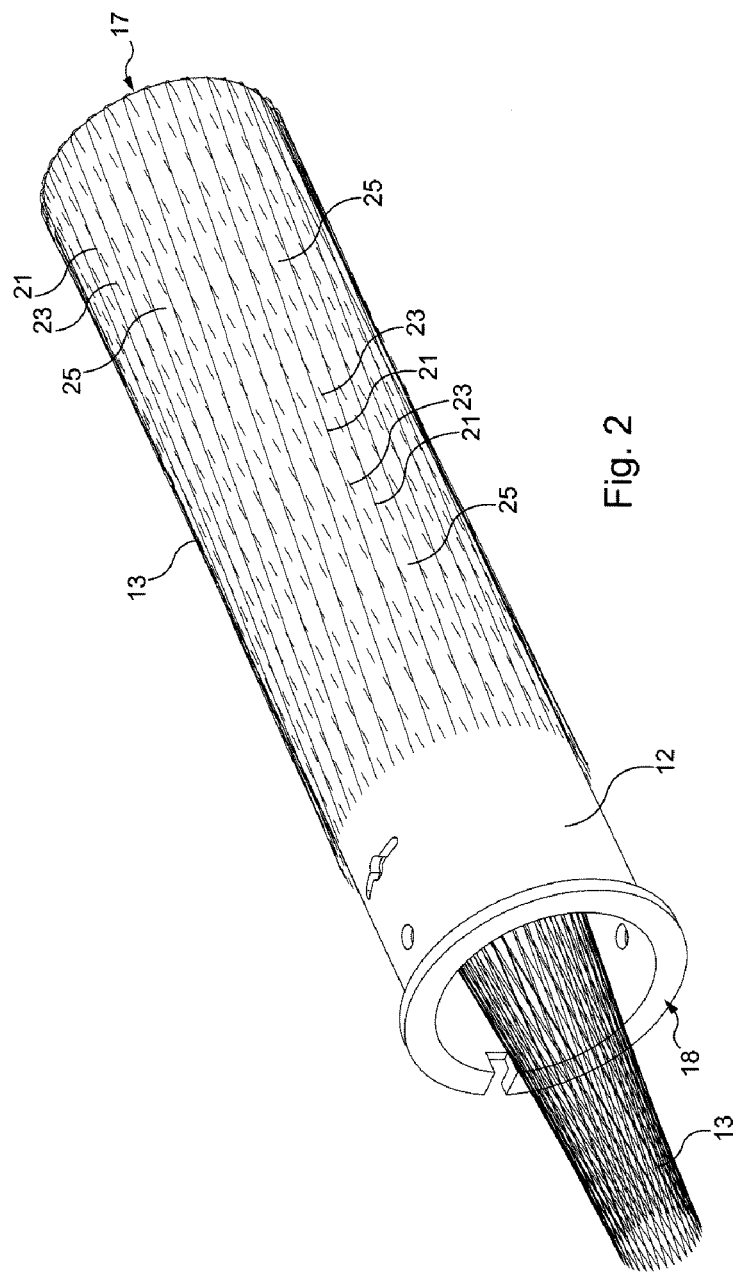
FIG. 2 is a perspective view of the kit of the invention without the elastic sleeve.

In FIG. 2, on the outside of the core 12, the filaments 21 are represented in solid line and the filaments 23 in dashed line.

In the example shown, the inside diameter of the net 13 at rest (in the absence of external loads) corresponds to the outside diameter of the core 12, so that the net 13 is lightly gripped onto the outside surface of the core 12.

Thus the portion of the net 13 externally surrounding the core 12 is shown in the rest position (with no deformation).

In this rest position:
the filaments 21 of the layer 20 are parallel to each other and regularly spaced from each other;
the filaments 23 of the layer 22 are parallel to each other and regularly spaced from each other at the same pitch as the filaments 21 of the layer 20; and
the filaments 21 of the layer 20 are inclined relative to the axial direction (the direction of the axis 24 in FIG. 1 and the vertical direction in FIG. 4) at a predetermined angle in a first direction (upward and toward the right in FIG. 4) and the filaments 23 are inclined at the same angle but in the opposite direction (upward and toward the left in FIG. 4).

The filaments 21 and 23 are joined together at their intersections, here by welding.

The net 13 thus has regular meshes 25 each of which is lozenge-shaped with a weld between a filament 21 and a filament 23 at each corner.

In the example shown, the net 13 is made of extruded plastic material, here polypropylene, the filaments 21 and 23 being pressed together when they are still hot so that they are welded to each other at their intersections.

Thanks to the flexibility of the filaments constituting it, the net 13 is capable of adopting a diameter greater than its diameter at rest, the sides of the meshes 25 becoming rounded to enable the increase in diameter.

This is accompanied by a reduction in the length of the net 13.

It is equally possible to deform the net 13 relative to its rest position by exerting axial traction on it. The sides of the meshes 25 then move toward each other, the diameter of the net 13 decreases and its lengths increases.

To install the net 13 on the core 12, the net 13 is inserted into the interior of the core 12 and is then turned back on itself at the end 17 so that it is pressed onto the external surface of the core 12, as shown in FIG. 2.

The core fitted in this way with the net 13 is placed inside the sleeve 11 in the conventional way, for example as described in French patent application 2 786 954.

As can be seen in FIG. 5 in particular, in the portion of the net 13 disposed between the core 12 and the sleeve 11, the layer 20 of filaments 21 is on the same side as the sleeve 11 and the layer 22 of filaments 23 is on the same side as the core 12.

FIG. 6 shows an elongate member 30 inserted into the portion of the net 13 inside the core 12. Here the elongate member 30 is an end of an electrical cable 31 fitted with a connecting terminal 32.

Here the terminal 32 is adapted to be connected to a power supply terminal of an electrical power distribution network transformer.

Further to the terminal 32, the end 30 of the cable includes a connector 33 for connecting a shielding jacket of the cable 31 to a conductive grounding braid 34.

The end 30 is positioned inside the device 10 so that the distal portion of the terminal 32 is located beyond the end 18 of the core 12. The length of the kit 10 is such that the connector 33 is then inside the core 12.

For the sleeve 11 to come to cover the cable end or the elongate member 30, the operator grasps the portion of the net 13 located beyond the distal end of the terminal 32 (the leftmost portion of the net 13 in FIG. 6) in one hand and exerts traction on the net 13 while holding the sleeve 11 with the other hand.

Because of this traction, the core 12 slides relative to the sleeve 11 and the elongate member 30 in the direction from its end 17 toward its end 18.

This enables the sleeve 11 to contract onto the elongate member 30 beyond the end 17 of the core 12. This contraction also applies some thrust to the end 17, which facilitates the sliding of the core 12.

Figure 7:
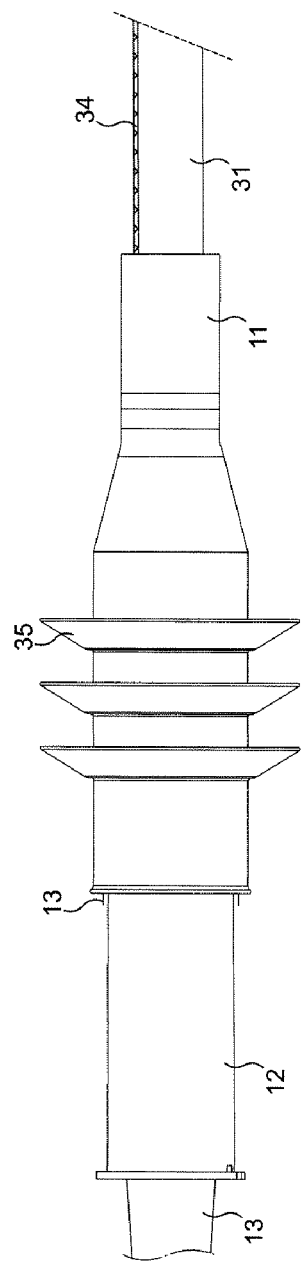
FIG. 7 is a view showing the elastic sleeve in the process of being placed on the elongate member.

FIG. 7 shows the sleeve 11 being placed on the elongate member 30, the sleeve 11 contracting onto the elongate member 30 and the core 12 being expelled.

When the entire core 12 has been expelled, the sleeve 11 tightly covers the elongate member 30, for which it provides electrical insulation and an airtight and watertight seal.

It will be noted that in FIGS. 1 and 2 the portion of the net 13 inside the core 12 and then beyond the latter has been represented with a frustoconical shape to show that this portion of the net 13 is deformed when the traction force enabling placement of the sleeve 11 is exerted on the net 13.

This frustoconical shape has been chosen only to simplify the production of the drawings. In practice, this portion of the net 13 tends to grip the elongate member 30 and then to flatten out as far as the hand of the operator applying traction.

It will further be noted that the meshes 25 are represented in FIGS. 1 and 2 so as to show that they have a particular shape in the portion disposed between the sleeve 11 and the core 12 and that they change shape in the portion inside the core 12 and beyond the latter when traction is applied to the net 13.

The shapes of the meshes 25 shown in FIGS. 1 and 2 have been chosen only to facilitate the production of the drawings. In particular:

- in FIG. 2, in the portion of the net 13 that grips the outside surface of the sleeve 12, the size of the meshes 25 is particularly exaggerated (in practice the meshes are much smaller); and
- in FIGS. 1 and 2, in the portion of the net 13 represented as frustoconical, the meshes change shape, with their perimeter reduced, but the filaments 21 and 23 are not elastic, of course, and the perimeter of the meshes is in reality constant overall.

It will finally be noted that, as shown in FIGS. 2, 6 and 7, the sleeve 12 is provided at its end 18 with a flange (not represented in FIG. 1) extending perpendicularly from the end 18 that in some cases can be used to grip the sleeve 12 to facilitate its extraction.

It will be seen that, because it is formed of flexible filaments, the net 13 intrinsically has a particularly high aptitude for turning back on itself, including when this is effected under tension, as is the case when relatively high traction is applied to the net 13 to extract the core 12.

It will further be seen, in FIG. 1 in particular, that the end 17 of the core 12 is rounded.

This facilitates sliding of the net 13 over the end 17 when placing the sleeve 11 on an elongate member.

The portion of the net 13 that slides on the outside surface of the core 12 and over the end 17 is formed by the filaments 23 of the layer 22.

Because the filaments 23 are joined to each other by the filaments 21 of the layer 20 in a predetermined arrangement, the movements of the various filaments 23 relative to the core 12 remain homogeneous. Thus the core 12 is extracted by a regular movement that helps to make the maneuver to place the sleeve 11 effective.

Thus the net 13 is capable of replacing the low coefficient of friction film conventionally used until now to enable sliding between a sleeve such as the sleeve 11 and a core such as the core 12, or even capable, as in the example shown, of replacing the elastic link or element provided in some cases to cause the low coefficient of friction film to move.

It will be noted that the net 13 is less costly than the film conventionally used. Furthermore, provided that the hardness or elasticity of the elastic sleeve 11 is not too high, for example if its Shore A hardness according to the standard ISO48: 2007 is less than 30, it is possible to use the net 13 on its own, without adding lubricant.

In the example shown, the sleeve 11 is adapted to cover the cable end 30 shown in FIGS. 6 and 7.

Of course, in variants that are not shown, depending on the elongate member that must be tightly covered, which elongate member can of course be different from a cable end fitted with a connecting terminal, for example just a cable end, the sleeve 11 is replaced by a different sleeve, for example one that is longer or shorter and includes or not one or more frustoconical flanges such as the flanges 35 extending at an acute angle from a central region of the sleeve 11.

In the example shown, the core 12 has an outside circumference of the order of 18.4 cm, the filaments 21 and 23 of the net 13 have a thickness of the order of 1.4 mm, there are 42 meshes around a circumference of the net 13 and, at rest, there are 0.69 meshes per centimeter length in the axial direction (1.75 meshes per inch).

Alternatively, the net 13 is differently arranged, for example with the filaments 21 and 23 having a different thickness, for example 0.55 mm, 0.9 mm or 1.1 mm, a different number of meshes per circumference, for example 18, 30 or 36, or a different number of meshes per cm length in the axial direction, for example 0.79 or 1.57 (respectively 2 and 4 meshes per inch).

In variants that are not shown, the net 13 is replaced by a net arranged differently, for example by a net that is not tubular, such as a strip of net, by a net that is interrupted inside the core 12 after making the half-turn over the end 17, such a net being connected to an elastic or non-elastic tie for pulling on the net so that the sleeve can slide relative to the core, by a net arranged differently than as two layers of filaments, for example as only one layer or more than two layers, and/or by a net the meshes of which at rest have a shape other than a lozenge shape, for example a rectangle shape.

Numerous other variants are possible as a function of circumstances and in this regard it is pointed out that the invention is not limited to the examples described and shown.

The invention claimed is:

1. A kit for covering an elongate member with predetermined dimensions with a protective elastic sleeve, comprising:
    the protective elastic sleeve;
    a tubular core configured to stretch the sleeve, the tubular core being covered by said sleeve and configured to receive internally said elongate member; and
    a thin and flexible sliding element disposed between said sleeve and said core to enable said core to slide relative to said sleeve, the sliding element being configured to make a half-turn over a first end of the core so as thereafter to be disposed inside the core in order to be able to be pulled from a second end of the core opposite said first end, the sliding element including
        a net formed of flexible filaments including
            a first layer of filaments connected to each other in a predetermined arrangement, the first layer of filaments being configured to slide on an outside surface of the core and to turn back on themselves around said first end of the core, and
            a second layer of filaments superposed on the first layer, the first and second layers of filaments being plastic material filaments welded to each other at corners of meshes.

2. The kit according to claim 1, wherein said sliding element is formed only by said net.

3. The kit according to claim 1, wherein said net is tubular.

4. The kit according to claim 1, wherein, at rest, said net has the meshes each of lozenge shape.

5. The kit according to claim 1, wherein said net is tubular, and
    the meshes are regularly distributed, with a number of meshes around a circumference between 18 and 42 inclusive and, at rest, a number of meshes per unit axial length between 0.69 and 1.57 per cm inclusive.

6. The kit according to claim 1, wherein said net is made of polypropylene.

7. The kit according to claim 1, wherein said net extends inside said core over the whole of the length of the core and then outside the core beyond said second end thereof.

8. The kit according to claim 1, wherein said first end of the core is rounded.

9. The kit according to claim 1, further comprising a flange extending perpendicularly from the second end of the tubular core, the flange providing a gripping point to facilitate extraction of the tubular core.

10. The kit according to claim 1, further comprising a frustoconical flange extending at an acute angle from a central region of the sleeve.

* * * * *